US007162715B1

United States Patent
Whittaker et al.

(10) Patent No.: US 7,162,715 B1
(45) Date of Patent: Jan. 9, 2007

(54) METHOD AND APPARATUS FOR PREEMPTIVE MONITORING OF SOFTWARE BINARIES BY INSTRUCTION INTERCEPTION AND DYNAMIC RECOMPILATION

(75) Inventors: James A. Whittaker, Indialantic, FL (US); Rahul Chaturvedi, Melbourne, FL (US); John R. Wagner, Melbourne, FL (US)

(73) Assignee: I-Squared, Inc., Melbourne, FL (US)

( * ) Notice: Subject to any disclaimer, the term of this patent is extended or adjusted under 35 U.S.C. 154(b) by 707 days.

(21) Appl. No.: 10/390,397

(22) Filed: Mar. 17, 2003

Related U.S. Application Data

(60) Provisional application No. 60/364,907, filed on Mar. 16, 2002.

(51) Int. Cl.
G06F 9/44 (2006.01)
(52) U.S. Cl. ...................................... 717/127; 717/130
(58) Field of Classification Search ......... 717/127–133
See application file for complete search history.

(56) References Cited

U.S. PATENT DOCUMENTS

| | | | |
|---|---|---|---|
| 5,412,717 A | 5/1995 | Fischer | |
| 5,657,445 A | 8/1997 | Pearce | |
| 5,696,822 A | 12/1997 | Nachenberg | |
| 5,809,138 A | 9/1998 | Netiv | |
| 5,822,517 A | 10/1998 | Dotan | |
| 5,892,904 A | 4/1999 | Atkinson et al. | |
| 5,933,640 A * | 8/1999 | Dion | 717/132 |
| 5,940,590 A | 8/1999 | Lynne et al. | |
| 5,974,549 A | 10/1999 | Golan | |
| 5,978,484 A | 11/1999 | Apperson et al. | |
| 5,987,611 A | 11/1999 | Freund | |
| 6,035,423 A | 3/2000 | Hodges et al. | |
| 6,065,118 A | 5/2000 | Bull et al. | |
| 6,112,304 A | 8/2000 | Clawson | |
| 6,167,520 A | 12/2000 | Touboul | |
| 6,192,477 B1 | 2/2001 | Corthell | |
| 6,192,512 B1 | 2/2001 | Chess | |
| 6,199,181 B1 | 3/2001 | Rechef et al. | |
| 6,275,938 B1 | 8/2001 | Bond et al. | |
| 6,357,008 B1 | 3/2002 | Nachenberg | |
| 6,671,825 B1 * | 12/2003 | Joshi et al. | 714/38 |
| 6,804,780 B1 | 10/2004 | Touboul | |
| 6,839,894 B1 * | 1/2005 | Joshi et al. | 717/130 |
| 2002/0013910 A1 | 1/2002 | Edery et al. | |

(Continued)

OTHER PUBLICATIONS

McCartney, "The Net Threat", informationweek.com, Feb. 10, 1997.

(Continued)

*Primary Examiner*—Kakali Chaki
*Assistant Examiner*—Trenton J. Roche
(74) *Attorney, Agent, or Firm*—IP Strategies

(57) ABSTRACT

A method of executing a program in a controlled environment includes initiating execution of an operating system with which the program is adapted to execute, inserting redirection logic at the beginning of the program, and executing the program such that the redirection logic is executed. A current instruction pointer is stored, and execution control is redirected to a program loader. The program loader selects a first block of instructions of the program, based at least in part on the stored current instruction pointer. This selected block of instructions is manipulated to provide a first phantom instruction block, which is executed in the controlled environment. This manipulation includes copying at least a portion of the selected first block to form the first phantom instruction block.

34 Claims, 5 Drawing Sheets

U.S. PATENT DOCUMENTS

2002/0069363 A1  6/2002  Winburn
2004/0107228 A1  6/2004  Autrey et al.

OTHER PUBLICATIONS

Toolsmith, "What is HU Sandbox?", HU Sandbox 1.00. Apr. 7, 2000.

Marcus2@IDT.Net, "ECM INFO", Feb. 24, 1999, Usenet: alt.dss and alt.dss.hack.

Jackhammer, "Re: From Magician at PD", Nov. 8, 2000, Usenet: alt.dss.hack.

* cited by examiner

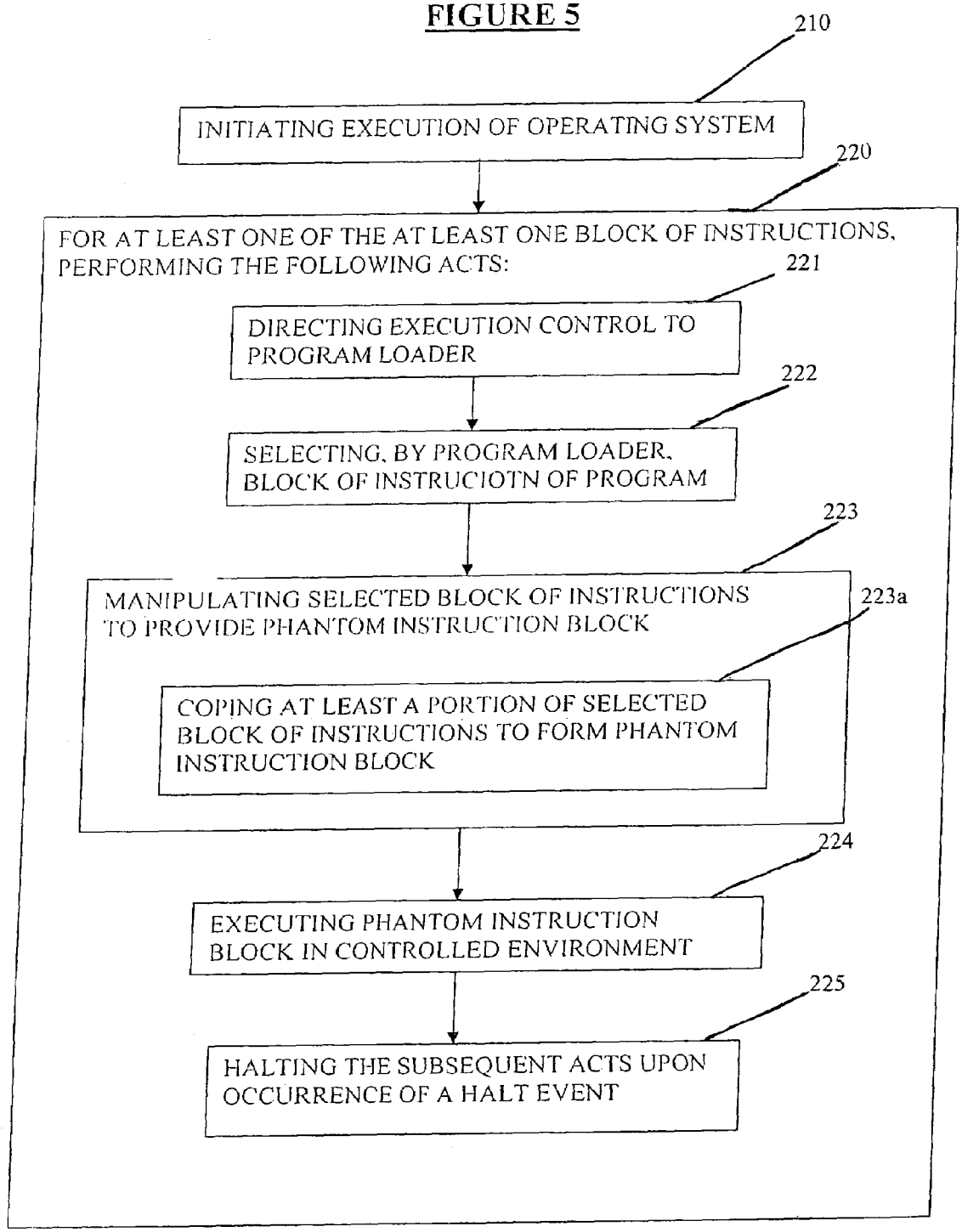

METHOD AND APPARATUS FOR PREEMPTIVE MONITORING OF SOFTWARE BINARIES BY INSTRUCTION INTERCEPTION AND DYNAMIC RECOMPILATION

CROSS-REFERENCE TO RELATED DOCUMENTS

This document claims the priority benefit, and incorporates by reference in its entirety, U.S. Provision Patent Application No. 60/364,907 filed on Mar. 16, 2002.

FIELD OF THE INVENTION

The present invention relates to software monitoring, testing and analysis.

BACKGROUND OF THE INVENTION

Processes for monitoring software behavior have many applications in both offensive and defensive cyberwarfare and also in software testing/debugging. Whenever intelligence about an application needs to be gathered, the behavior of the application is monitored and conclusions drawn by analyzing the results.

When the source code of the application is available, one can monitor the behavior of the application on an instruction-by-instruction basis. Such monitoring allows the behavior to be better understood for the purposes of reengineering or debugging. Access to the source code allows exposure of all relevant information about the software's behavior, both external behavior and internal behavior. This includes calls to external components and the parameters of these calls, calls to internal components and the parameters of these calls, internally stored data, and control structures.

However, when the source code is not available, one must work with only the compiled binary of the application (for example, the executable, library or component). This means that only the machine code is available for analysis. As such it is much more difficult to get the detailed information that source debuggers can get.

Conventional systems include technology to intercept external behavior such as calls to the operating system or third party components. This technique is called system call interception. Conventional techniques also include the use of disassemblers to extract certain bits of internal information, but disassembly is a painstaking process fraught with trial and error. In general, information inside the binary executes without scrutiny and with no opportunity to intervene to change behavior in any predictable fashion. Internal functions, stored data, and individual control statements can be unreachable externally.

System call interception has many uses including proactive antivirus tools and testing/debugging tools. However, there are many behaviors that escape such external scrutiny. For example, instructions that call exception handlers or interrupts execute without making system calls and can bypass monitoring or protective software.

The only currently-known solution to intercept such dispatch mechanisms is to insert code into the operating system kernel that detects these dispatches and notifies the monitoring application. There is a disadvantage to this solution in that because the actual operating system kernel is modified, every single application is intercepted instead of just the application being monitored, and such "kernel mode" solutions tend to destabilize the operating system.

Therefore, there is a need for an improved software monitoring solution.

BRIEF SUMMARY OF THE INVENTION

The present invention includes a method of executing a program in a controlled environment, which can be embodied in software components and user interface programs that can either be incorporated into other software or that can be used in a standalone fashion. The broad process of the invention can be realized in any of many specific embodiments, and there are many advantageous uses for the process. For example, the process can be applied to blocking the behaviors of malicious programs such as viruses, worms, and Trojan horse and zombie programs. Further, the process can be used to monitor behavior so that an application can be coaxed into revealing hidden features and functionality. For example, the process can be used to crack encryption keys (to discover private data and information) and CD keys (to enable software piracy). These applications are useful as evaluation tools.

Therefore, according to an exemplary aspect of the invention, a method of executing a program in a controlled environment includes initiating execution of an operating system with which the program is adapted to execute, inserting redirection logic at the beginning of the program, and executing the program such that the redirection logic is executed. A current instruction pointer is stored, and execution control is redirected to a program loader. The program loader selects a first block of instructions of the program, based at least in part on the stored current instruction pointer. This selected block of instructions is manipulated to provide a first phantom instruction block, which is executed in the controlled environment. This manipulation includes copying at least a portion of the selected first block to form the first phantom instruction block.

The selected first block of instructions includes one or more instructions. That is, although referred to as a block, the block can be a single instruction, or it can include a number of instructions.

The manipulation of the selected block of instructions can also include marking the selected first block as read-only, or logically modifying at least a portion of the first phantom instruction block, or both. In turn, logically modifying at least a portion of the first phantom instruction block can include any one or combination of inserting program logic into the first phantom instruction block, deleting program logic from the first phantom instruction block, and changing program logic in the first phantom instruction block.

Execution of the first phantom instruction block in the controlled environment can include any one or combination of monitoring execution of the first phantom instruction block, preventing at least a first portion of the first phantom instruction block from executing, and modifying at least a second portion of the first phantom instruction block before the second portion executes. The controlled environment can include a user interface by which a user can execute and monitor execution of the first phantom instruction block.

The current instruction pointer can be stored by pushing the current instruction pointer onto a stack.

The acts can further include storing a next instruction pointer, for example, after executing the first phantom instruction block. In this case, the program loader selects a second block of instructions of the program based at least in part on the stored next instruction pointer, and the selected second block of instructions is manipulated to provide a second phantom instruction block. This manipulation of the selected second block includes copying at least a portion of the selected second block to form the second phantom instruction block, and executing the second phantom instruction block in the controlled environment. The selected second block of instructions includes one or more instructions. The manipulation of the selected first and second blocks can also include marking the first and second blocks as read-only, or logically modifying at least a portion of the first and second phantom instruction blocks, or both. In turn, logically modifying at least a portion of the first and second phantom instruction blocks can include any one or combination of inserting program logic into the first and second phantom instruction blocks, deleting program logic from the first and second phantom instruction blocks, and changing program logic in the first and second phantom instruction blocks.

The operating system can include a thread spawning routine having at least one block of instructions. In this case, the method of the invention can also include inserting second redirection logic at a beginning of the thread spawning routine that directs execution control to the program loader and executing the thread spawning routine.

The operating system can include an exception handling routine having at least one block of instructions. In this case, the method of the invention can also include inserting, at a beginning of the exception handling routine, second redirection logic that directs execution control to the program loader, and executing the exception handling routine.

According to another aspect of the present invention a method of executing, in a controlled environment, a program having at least one block of instructions includes initiating execution of an operating system with which the program is adapted to execute, and performing a number of subsequent acts for at least one of the blocks of instructions. These acts include directing execution control to a program loader. Also, a block of instructions of the program is selected by the program loader, and the selected block of instructions is manipulated to provide a phantom instruction block. This phantom instruction block is executed in the controlled environment. The manipulation of the selected block of instructions includes copying at least a portion of the selected block to form the phantom instruction block. Each selected block includes at least one instruction.

The subsequent acts can also include halting the subsequent acts based on the occurrence of a halt event.

The manipulation of the selected block of instructions can also include marking the selected block as read-only, or logically modifying at least a portion of the phantom instruction block, or both. In turn, logically modifying at least a portion of the phantom instruction block can include any one or combination of inserting program logic into the phantom instruction block, deleting program logic from the phantom instruction block, and changing program logic in the phantom instruction block.

Execution of the phantom instruction block in the controlled environment can include any one or combination of monitoring execution of the phantom instruction block, preventing at least a first portion of the phantom instruction block from executing, and modifying at least a second portion of the phantom instruction block before the second portion executes. The controlled environment can include a user interface by which a user can execute and monitor execution of the phantom instruction block.

The method of the invention can also include inserting first redirection logic within the program that directs execution control to the program loader, and executing the program. The subsequent acts can include storing a respective current instruction pointer. In this case, the program loader selects the block of instructions of the program based at least in part on the stored respective current instruction pointer.

The operating system can include a thread spawning routine having at least one set of instructions, wherein the set of instructions can include as few as a single instruction. Thus, the method of the invention can also include inserting second redirection logic at the beginning of the thread spawning routine that directs execution control to the program loader, and executing the thread spawning routine. In this case, the method of the invention can also include performing additional actions for at least one set of instructions. These additional actions include redirecting execution control to the program loader. Also, a set of instructions of the thread spawning routine is selected by the program loader, and the selected set of instructions is manipulated to provide a phantom instruction set. The phantom instruction set is executed in the controlled environment. Each selected set of instructions includes at least one instruction, and manipulating the selected set of instructions includes copying at least a portion of the selected set of instructions to form the phantom instruction set.

Alternatively, or in addition, the operating system can include an exception handling routine having at least one set of instructions. Thus, the method of the invention can also include inserting additional redirection logic at a beginning of the exception handling routine that directs execution control to the program loader, and executing the exception handling routine. In this case, the method of the invention also includes performing subsequent actions for at least one set of instructions. These subsequent actions can include redirecting execution control to the program loader. A set of instructions of the exception handling routine is selected by the program loader, and the selected set of instructions is manipulated to provide a phantom instruction set. The phantom instruction set is executed in the controlled environment. Each selected set of instructions can include as few as a single instruction, and manipulating the selected set of instructions includes copying at least a portion of the selected set of instructions to form the phantom instruction set.

The manipulation of the selected block can also include determining if the selected block is represented by current data stored in a cache. If the selected block is not represented by the current data stored in the cache, at least a portion of the selected block is copied to form the phantom instruction block, and additional data representative of the formed phantom instruction block is added to the cache. On the other hand, if the selected block is represented by the current data stored in the cache, the current data representative of the selected block of instruction is referenced to provide the phantom instruction block. The manipulation of the selected block can also include determining if the selected block of instructions invariably directs execution control to a different block of instructions represented by the current data stored in the cache. If the selected block of instructions is determined to invariably direct execution control to the different block of instructions, redirection logic is inserted into the selected block that directs execution control to a cached phantom instruction block representative of the different block.

BRIEF DESCRIPTION OF THE DRAWINGS

The present invention is illustrated by way of example and not limitation in the figures of the accompanying drawings, in which:

FIG. 5 is a flow diagram showing yet another exemplary process of the invention.

DETAILED DESCRIPTION OF THE INVENTION

Figure 1:
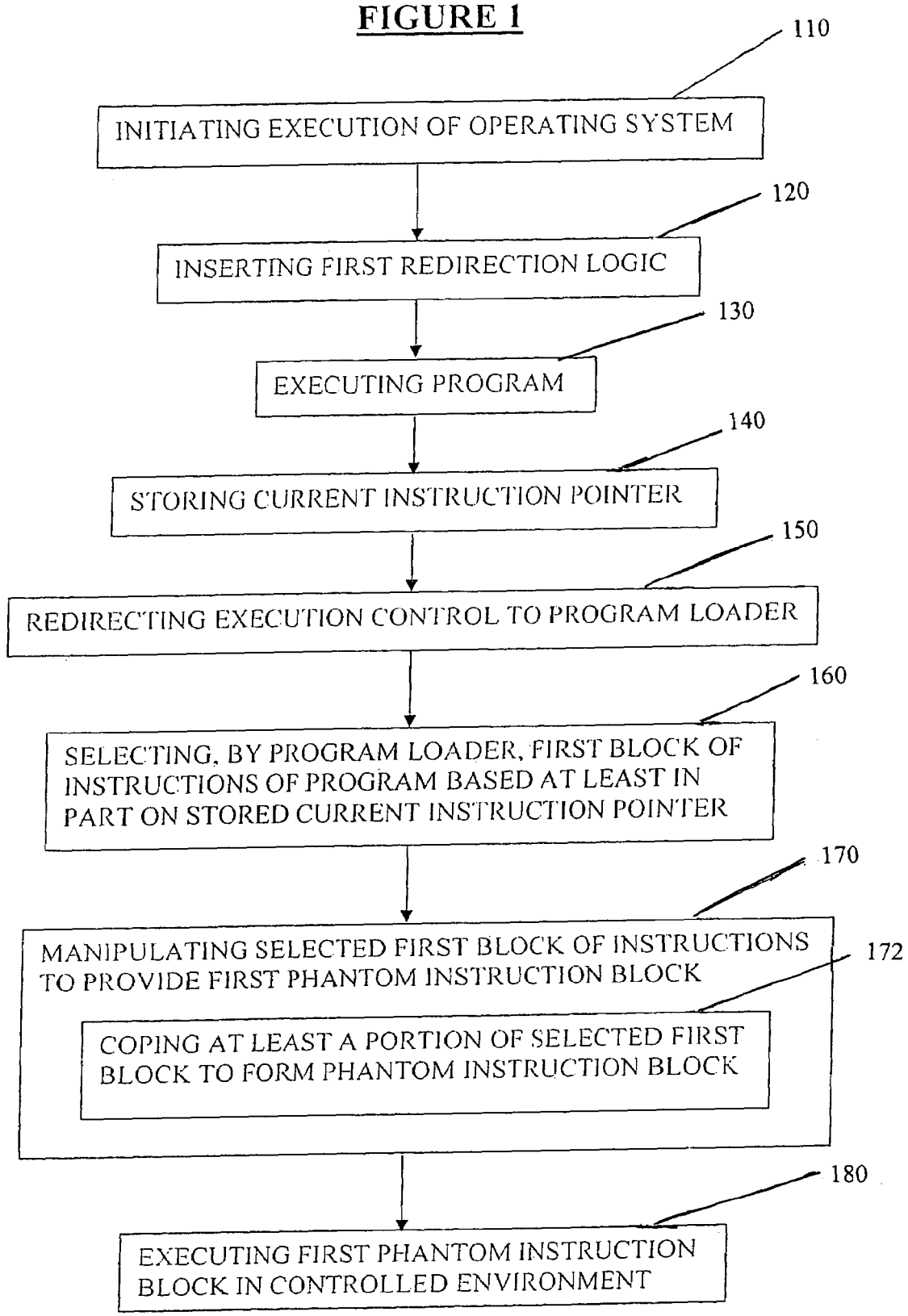
FIG. 1 is a flow diagram illustrating an exemplary process of the invention.

FIG. 1 illustrates an exemplary aspect of the invention, in which a method of executing a program in a controlled environment includes initiating execution of an operating system with which the program is adapted to execute (110), inserting redirection logic at the beginning of the program (120), and executing the program such that the redirection logic is executed (130). Further, a current instruction pointer is stored (140), and execution control is redirected to a program loader (150). The program loader selects a first block of instructions of the program (160), based at least in part on the stored current instruction pointer. This selected block of instructions is manipulated to provide a first phantom instruction block (170), which is executed in the controlled environment (180). This manipulation includes copying at least a portion of the selected first block to form the first phantom instruction block (172). Thus, controlled execution of the program (or selected block or blocks) is achieved by executing a phantom block or blocks. As shown, the original program itself is not executed; instead, a phantom copy of the program (a phantom block or blocks instructions) is executed.

It should be noted that the selected first block of instructions can include one or more instructions. That is, although referred to as a block, the selected block can be a single instruction, or it can include multiple instructions.

Figure 2:
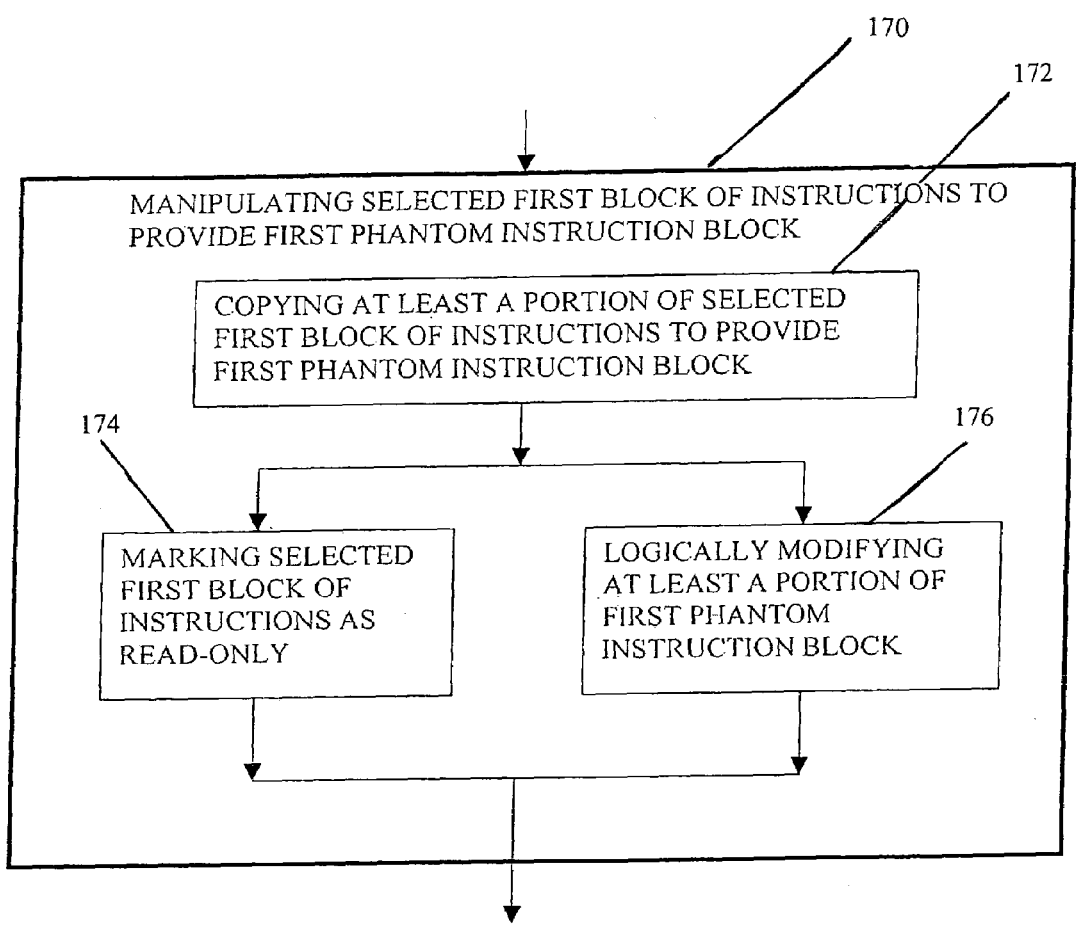
FIG. 2 shows an exemplary detail of an instruction manipulation action according to the invention.

As shown in FIG. 2, the manipulation of the selected block of instructions (170) can also include marking the selected first block as read-only (174), or logically modifying at least a portion of the first phantom instruction block (176), or both. By marking the selected first block as read-only (174), the risk that self-modifying code will modify a previously selected block of instructions is avoided, so as to ensure, for example, that program control is not lost. In turn, logically modifying at least a portion of the first phantom instruction block (176) can include any one or combination of inserting program logic into the first phantom instruction block, deleting program logic from the first phantom instruction block, and changing program logic in the first phantom instruction block.

Figure 3:
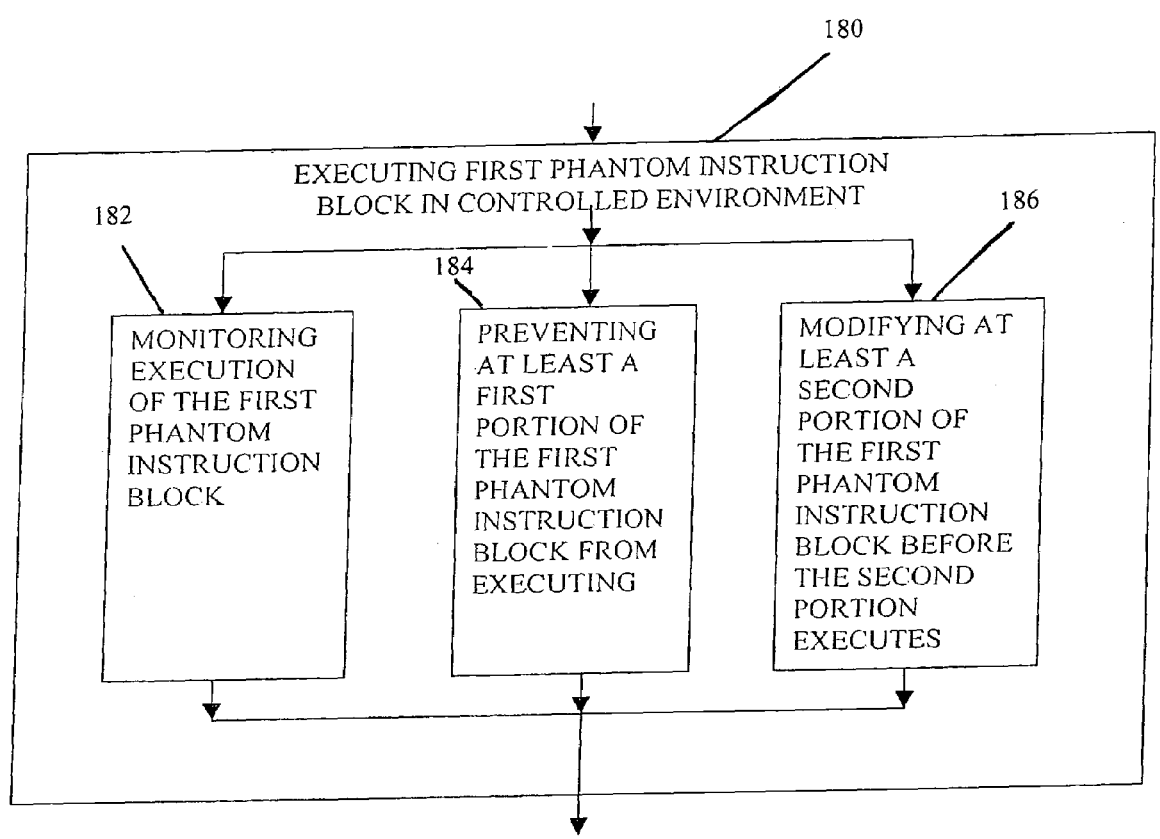
FIG. 3 shows an exemplary detail of a phantom instruction execution action according to the invention.

As illustrated in FIG. 3, execution of the first phantom instruction block in the controlled environment (180) can include any one or combination of monitoring execution of the first phantom instruction block (182), preventing at least a first portion of the first phantom instruction block from executing (184), and modifying at least a second portion of the first phantom instruction block before the second portion executes (186). The controlled environment can include a user interface by which a user can execute and monitor execution of the first phantom instruction block, such as monitoring the values of system and/or program variables and states, and system memory, as well as other system or program states and conditions. According to another exemplary aspect of the invention, a user interface can provide a "debugging" environment, with which a user can execute, monitor, modify and/or prevent execution of one or more instructions contained in a phantom instruction block. In another exemplary aspect of the invention, a user interface can allow a user to trace and step through, on an instruction-by-instruction basis, the one or more instructions contained in a phantom instruction block. Further, a user interface can allow a user to watch changes in the values of variables as instructions are stepped through or traced.

The current instruction pointer can be stored in a memory, such as RAM, hard drive, or other memory, for example and not in limitation. Further, the current instruction pointer can be stored by pushing the current instruction pointer onto a stack, for example and not in limitation.

The method can further include executing a second block of instructions in the controlled environment, following storage of the current instruction pointer (140). For example, the method can further include storing a next instruction pointer, after executing the first phantom instruction block. In this case, the program loader selects a second block of instructions of the program based at least in part on the stored next instruction pointer, and the selected second block of instructions is manipulated to provide a second phantom instruction block. This manipulation of the selected second block includes copying at least a portion of the selected second block to form the second phantom instruction block, and executing the second phantom instruction block in the controlled environment. The selected second block of instructions includes one or more instructions. The manipulation of the selected first and second blocks can also include marking the first and second blocks as read-only, or logically modifying at least a portion of the first and second phantom instruction blocks, or both. In turn, logically modifying at least a portion of the first and second phantom instruction blocks can include any one or combination of inserting program logic into the first and second phantom instruction blocks, deleting program logic from the first and second phantom instruction blocks, and changing program logic in the first and second phantom instruction blocks.

According to a further exemplary aspect of the invention, the operating system can include a thread spawning routine having at least one block of instructions, and therefore, the method can further include actions for accounting for thread spawning, which can cause a loss of execution control. Accordingly, the method can further include actions that logically mirror other actions in execution of the method, starting from initiation of execution of the operating system. Thus, the method of the invention can also include inserting second redirection logic at a beginning of the thread spawning routine that directs execution control to the program loader, and executing the thread spawning routine.

Alternatively, or in addition, the operating system can include an exception handling routine having at least one set of instructions. Accordingly, the method of the present invention can further include actions for accounting for exceptions, which can also cause a loss of execution control. Accordingly, the method can further include inserting second redirection logic, at a beginning of the exception handling routine, that directs execution control to the program loader, and executing the exception handling routine.

Figure 4:
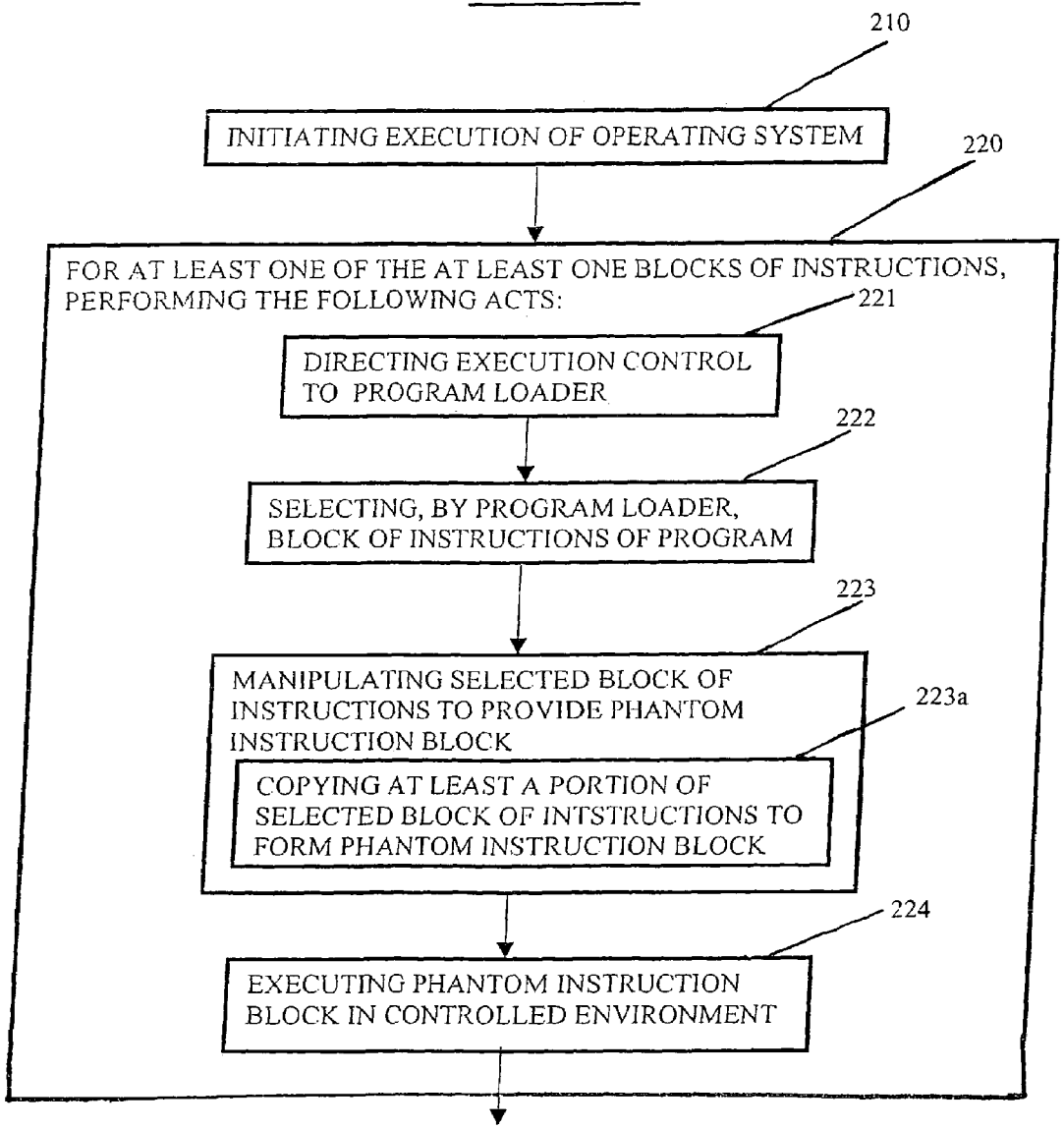
FIG. 4 is a flow diagram illustrating another exemplary process of the invention.

As shown in FIG. 4, according to another exemplary aspect of the present invention, a method of executing, in a controlled environment, a program having at least one block of instructions includes initiating execution of an operating system with which the program is adapted to execute (210), and performing a number of subsequent actions for at least one of the blocks of instructions (220). These actions include directing execution control to a program loader (221). Also, a block of instructions of the program is selected by the program loader (222), and the selected block of instructions is manipulated to provide a phantom instruction block (223). This phantom instruction block is executed in the controlled environment (224). The manipulation of the selected block of instructions includes copying at least a portion of the selected block to form the phantom instruction block (223a). Each selected block includes at least one instruction.

As shown in FIG. 5, the subsequent actions can also include halting further actions based on the occurrence of a halt event (225), which can include, for example and not in limitation, a stop command, and a logical condition within program logic (for example, WHILE NOT END OF FILE).

The manipulation of the selected block of instructions can also include marking the selected block as read-only, or logically modifying at least a portion of the phantom instruction block, or both. In turn, logically modifying at least a portion of the phantom instruction block can include any one or combination of inserting program logic into the phantom instruction block, deleting program logic from the phantom instruction block, and changing program logic in the phantom instruction block.

Execution of the phantom instruction block in the controlled environment can include any one or combination of monitoring execution of the phantom instruction block, preventing at least a first portion of the phantom instruction block from executing, and modifying at least a second portion of the phantom instruction block before the second portion executes. The controlled environment can include a user interface by which a user can execute and monitor execution of the phantom instruction block, such as monitoring the values of system and/or program variables and states, and system memory, as well as other system or program states and conditions. According to an exemplary aspect of the invention, a user interface can provide a "debugging" environment, with which a user can execute, monitor, modify and/or prevent execution of one or more instructions contained in a phantom instruction block. According to another exemplary aspect of the invention, a user interface can allow a user to trace and step through, on an instruction-by-instruction basis, the one or more instructions contained in a phantom instruction block. Further, a user interface can allow a user to watch changes in the values of variables as instructions are stepped through or traced.

This method of the present invention can also include inserting, within the program, first redirection logic that directs execution control to the program loader, and executing the program. In this case, the subsequent actions can further include storing a respective current instruction pointer, such that the program loader selects the block of instructions of the program based at least in part on the stored respective current instruction pointer.

According to another exemplary aspect of this invention, as per an earlier described exemplary aspect, the operating system can include a thread spawning routine having at least one set of instructions, wherein a set of instructions can include as few as a single instruction. Thus, this method of the invention can also include inserting, at the beginning of the thread spawning routine, second redirection logic that directs execution control to the program loader, and executing the thread spawning routine. In this case, this method of the invention can also include performing additional actions for at least one set of instructions. These additional actions can include redirecting execution control to the program loader. Also, a set of instructions of the thread spawning routine is selected by the program loader, and the selected set of instructions is manipulated to provide a phantom instruction set. The phantom instruction set is executed in the controlled environment. Each selected set of instructions includes at least one instruction, and manipulating the selected set of instructions includes copying at least a portion of the selected set of instructions to form the phantom instruction set.

Alternatively, or in addition, the operating system, as per a previously described exemplary aspect of the present invention, can include an exception handling routine having at least one set of instructions. Thus, the method of the invention can also include inserting, at a beginning of the exception handling routine, additional redirection logic that directs execution control to the program loader, and executing the exception handling routine. In this case, the method of the invention also includes performing subsequent actions for at least one set of instructions. These subsequent actions can include redirecting execution control to the program loader. A set of instructions of the exception handling routine is selected by the program loader, and the selected set of instructions is manipulated to provide a phantom instruction set. The phantom instruction set is executed in the controlled environment. Each selected set of instructions can include as few as a single instruction, and manipulating the selected set of instructions includes copying at least a portion of the selected set of instructions to form the phantom instruction set.

According to yet another exemplary aspect of the present invention, the manipulation of the selected block can also include determining if the selected block is represented by current data stored in a cache. If the selected block is not represented by the current data stored in the cache, at least a portion of the selected block is copied to form the phantom instruction block, and additional data representative of the formed phantom instruction block is added to the cache. On the other hand, if the selected block is represented by the current data stored in the cache, the current data representative of the selected block of instructions is referenced to provide the phantom instruction block. The manipulation of the selected block can also include determining if the selected block of instructions invariably directs execution control to a different block of instructions represented by the current data stored in the cache. If it is determined that the selected block of instructions invariably directs execution control to the different block of instructions, redirection logic is inserted into the selected block that directs execution control to a cached phantom instruction block representative of the different block.

It should be noted that the present invention can be further embodied in an apparatus, as well as a computer readable medium, each of which being based on the process embodiments described herein.

In the foregoing written description, the invention has been described with reference to specific embodiments thereof. However, it will be evident that various modifications and/or changes may be made thereto without departing from the broader spirit and scope of the invention. Accordingly, the specification and drawings are to be regarded in an illustrative and enabling, rather than a restrictive, sense.

We claim:

1. A method of executing a program in a controlled environment, comprising:
   initiating execution of an operating system with which the program is adapted to execute;
   inserting, at a beginning of the program, first redirection logic;

executing the program such that the first redirection logic is executed;

storing a current instruction pointer;

redirecting execution control to a program loader;

selecting, by the program loader, a first block of instructions of the program based at least in part on the stored current instruction pointer;

manipulating the selected first block of instructions provide a first phantom instruction block; and executing the first phantom instruction block in the controlled environment;

wherein the selected first block of instructions includes at least one instruction, and manipulating the selected first block includes copying at least a portion of the selected first block to form the first phantom instruction block; and wherein executing the first phantom instruction block in the controlled environment includes at least one of monitoring execution of the first phantom instruction block, preventing at least a first portion of the first phantom instruction block from executing, and modifying at least a second portion of the first phantom instruction block before the at least a second portion executes.

2. The method of claim 1, wherein manipulating the selected first block of instructions further includes, at least one of marking the selected first block as read-only, and logically modifying at least a portion of the first phantom instruction block.

3. The method of claim 2, wherein logically modifying the at least a portion of the first phantom instruction block includes at least one of inserting program logic into the first phantom instruction block, deleting program logic from the first phantom instruction block, and changing program logic in the first phantom instruction block.

4. The method of claim 1, wherein the controlled environment includes a user interface by which a user can execute the first phantom instruction block.

5. The method of claim 1, wherein the selected first block of instructions includes a plurality of instructions.

6. The method of claim 1, wherein storing a current instruction pointer includes pushing the current instruction pointer onto a slack.

7. The method of claim 1 wherein the acts further comprise:

storing a next instruction pointer;

selecting, by the program loader, a second block of instructions of the program based at least in part on the stored next instruction pointer;

manipulating the selected second block of instructions to provide a second phantom instruction block, wherein manipulating the selected second block includes copying at least a portion of the selected second block to form the second phantom instruction block; and executing the second phantom instruction block in the controlled environment;

wherein the selected second block includes at least one instruction.

8. The method of claim 7, wherein manipulating the selected first and second blocks further include at least one of marking the first and second blocks as read-only, and logically modifying at least a portion of the first and second phantom instruction blocks.

9. The method of claim 8, wherein logically modifying the at least a portion of the first and second phantom instruction blocks includes at least one of inserting program logic into the first and second phantom instruction blocks, deleting program logic from the first and second phantom instruction blocks, and changing program logic in the first and second phantom instruction blocks.

10. The method of claim 1, wherein the operating system includes a thread spawning routine having at least one block of instructions, and said method further comprises:

inserting, at a beginning of the thread spawning routine, second redirection logic that directs execution control to the program loader; and executing the thread spawning routine.

11. The method of claim 1, wherein the operating system includes an exception handling routine having at least one block of instructions, and said method further comprises:

inserting, at a beginning of the exception handling routine, second redirection logic that directs execution control to the program loader; and executing the exception handling routine.

12. A method of executing, in a controlled environment, a program having at least one block of instructions, comprising:

initiating execution of an operating system with which the program is adopted to execute; and for at least one of the at least one blocks of instructions, performing acts including directing execution control to a program loader, selecting, by the program loader, a block of instructions of the program;

manipulating the select block of instructions to provide a phantom instruction block, and executing the phantom instruction block in the controlled environment;

wherein each selected block includes at least one instruction, and manipulating the selected block includes copying at least a portion of the selected block to form the phantom instruction block; and wherein executing the phantom instruction block in the controlled environment includes at least one of monitoring execution of the phantom instruction block, preventing at least a first portion of the phantom instruction block from executing, and modifying at least a second portion of the phantom instruction block before the at least a second portion executes.

13. The method of claim 12 further comprising halting said acts based on the occurrence of a halt event.

14. The method of claim 12, wherein manipulating the selected block of instructions further includes at least one of marking the selected block as read-only, and logically modifying at least a portion of the phantom instruction block.

15. The method of claim 14, wherein logically modifying the at least a portion of the phantom instruction block includes at least one of inserting program logic into the phantom instruction block, deleting program logic from the phantom instruction block, and changing program logic in the phantom instruction block.

16. Me method of claim 12, wherein the controlled environment includes a user interface by which a user can execute the phantom instruction block.

17. The method of claim 12, wherein the method further comprises:
inserting, within the program, first redirection logic that directs execution control to the program loader; and
executing the program;
wherein said acts further include storing a respective current instruction pointer, and the program loader selects the block of instructions of the program based at least in part on the stored respective current instruction pointer.

18. The method of claim 12, wherein the operating system includes a thread spawning routine having at least one set of instructions, and said method further comprises:
inserting, at a beginning of the thread spawning routine, second redirection logic that directs execution control to the program loader; and
executing the thread spawning routine;
wherein each set of instructions includes at least one instruction.

19. The method of claim 18, further comprising
for at least one of the at least one set of instructions, performing actions including
redirecting execution control to the program loader,
selecting, by the program loader, a set of instructions of the thread spawning routine;
manipulating the selected set of instructions to provide a phantom instruction set, and
executing the phantom instruction set in the controlled environment;
wherein each selected set of instructions includes at least one instruction, and manipulating the selected set of instructions includes copying at least a portion of the selected set of instructions to form the phantom instruction set.

20. The method of claim 12, wherein the operating system includes an exception handling routine having at least one set of instructions, and said method further comprises:
inserting, at a beginning of the exception handling routine, second redirection logic that directs execution control to the program loader; and
executing the exception handing routine;
wherein each set of instructions includes at least one instruction.

21. The method of claim 20, further comprising
for at least one of the at least one set of instrtions, performing actions including
redirecting execution control to the program loader,
selecting, by the program loader, a set of instructions of the exception handling routine;
manipulating the selected set of instructions to provide a phantom instruction set, and
executing the phantom instruction set in the controlled environment;
wherein each selected set of instructions includes at least one instruction, and manipulating the selected set of instructions includes copying at least a portion of the selected set of instructions to form the phantom instruction set.

22. The method of claim 12, wherein manipulating the selected block of instructions further includes
determining if the selected block is represented by current data stored in a cache;
if the selected block is not represented by the current data stored in the cache,
copying at least a portion of the selected block to form the phantom instruction block, and
adding additional data representative of the formed phantom instruction block to the cache; and
if the selected block is represented by the current data stored in the cache, referencing the current data representative of the selected block of instruction to provide the phantom instruction block.

23. The method of claim 22, wherein manipulating the selected block further includes
determining if the selected block of instructions invariably directs execution control to a different block of instructions represented by the current data stored in the
if the selected block of instructions is determined to invariably direct execution control to the different block of instructions, inserting, into the selected block, first redirection logic that directs execution control to a cached phantom instruction block representative of the different block.

24. A method of executing, in a controlled environment, a program having at least one block of instructions, comprising:
initiating execution of an operating system with which the program is adapted to execute; and
for at least one of the at least one blocks of instructions, performing acts including
directing execution control to a program loader,
selecting, by the program loader, a block of instructions of the program;
manipulating the selected block of instructions to provide a phantom instruction block, and
executing the phantom instruction block in the controlled environment;
wherein each selected block includes at least one instruction, and manipulating the selected block includes copying at least a portion of the selected block to form the phantom instruction block;
wherein manipulating the selected block of instructions further includes
determining if the selected block is represented by current data stored in a cache;
if the selected block is not represented by the current data stored in the cache,
copying at least a portion of the selected block to form the phantom instruction block, and
adding additional data representative of the formed phantom instruction block to the cache; and
if the selected block is represented by the current data stored in the cache, referencing the current data representative of the selected block of instruction to provide the phantom instruction block; and
wherein manipulating the selected block further includes
determining if the selected block of instructions invariably directs execution control to a different block of instructions represented by the current data stored in the cache, and
if the selected block of instructions is determined to invariably direct execution control to the different block of instructions, inserting, into the selected block, first redirection logic that directs execution control to a cached phantom instruction block representative of the different block.

25. The method of claim 24, further comprising halting said acts bused on the occurrence of a halt event.

26. The method of claim 24, wherein manipulating the selected block of instructions further includes at least one of marking the selected block as read-only, and
logically modifying at least a portion of the phantom instruction block.

27. The method of claim 26, wherein logically modifying the at least a portion of the phantom instruction block includes at least one of
inserting program logic into the phantom instruction block,
deleting program logic from the phantom instruction block, and changing progran logic in the phantom instruction block.

28. The method of claim 24, wherein executing the phantom instruction block in the controlled environment includes at least one of
monitoring execution of the phantom instruction block,
preventing at least a first portion of the phantom instruction block from executing, and
modifying at least a second portion of the phantom instruction block before the at least a second portion executes.

29. The method of claim 28, wherein the controlled environment includes a user interface by which a user can execute the phantom instruction block.

30. The method of claim 24, wherein the method further comprises:
inserting, within the program, first redirection logic that directs execution control to the program loader; and
executing the program;
wherein said acts father include storing a respective current instruction pointer, and the program loader selects the block of instructions of the program based at least in part on the stored respective current instruction pointer.

31. The method of claim 24, wherein the operating system includes a thread spawning routine having at least one set of instructions, and said method further comprises:
inserting, at a beginning of the thread spawning routine, second redirection logic that directs execution control to the program loader; and
executing the thread spawning routine;
wherein each set of instructions includes at least one instruction.

32. The method of claim 31, further comprising
for at least one of the at least one set of instructions, performing actions including
redirecting execution control to the program loader,
selecting, by the program loader, a set of instructions of the bread spawning routine;
manipulating the selected set of instructions to provide a phantom instruction set, and
executing the phantom instruction set in the controlled environment;
wherein each selected set of instructions includes at least one instruction, and manipulating the selected set of instructions includes copying at least a portion of the selected set of instructions to form the phantom instruction set.

33. The method of claim 24, wherein the operating system includes an exception handling routine having at least one set of instructions, and said method further comprises:
inserting, at a beginning of the exception handling routine, second redirection logic that directs execution control to the program loader, and
executing the exception handling routine;
wherein each set of instructions includes at least one instruction.

34. The method of claim 33, further comprising
for at least one of the at least one set of instructions, performing actions including
redirecting execution control to the program loader,
selecting, by the program loader, a set of instructions of the exception handling routine;
manipulating the selected set of instructions to provide a phantom instruction set, and
executing the phantom instruction set in the controlled environment;
wherein each selected set of instructions includes at least one instruction, and manipulating the selected set of instructions includes copying at least a portion of the selected set of instructions to form the phantom instruction set.

* * * * *